No. 832,427.
PATENTED OCT. 2, 1906.
A. T. SISSON.
BALL BEARING.
APPLICATION FILED NOV. 24, 1905.
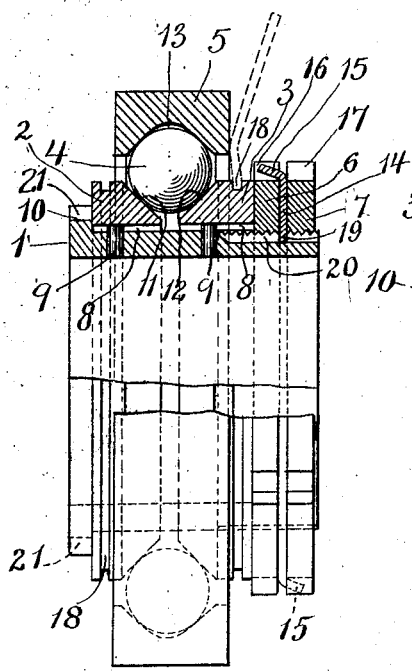
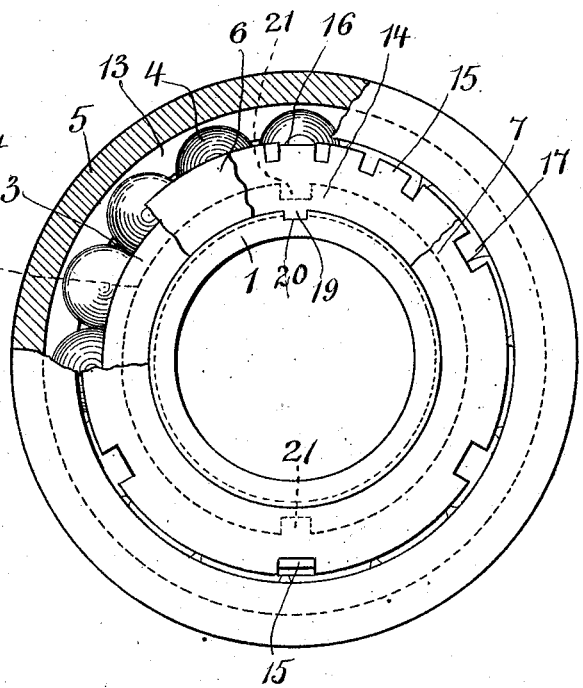
Witnesses
L. E. Kennedy
P. W. Pezzetti
Inventor
Albert T. Sisson
by Wright, Brown, Quinby & May
Att'ys

UNITED STATES PATENT OFFICE.

ALBERT T. SISSON, OF PROVIDENCE, RHODE ISLAND, ASSIGNOR, BY MESNE ASSIGNMENTS, TO W. PENN MATHER, OF PROVIDENCE, RHODE ISLAND.

BALL-BEARING.

No. 832,427. Specification of Letters Patent. Patented Oct. 2, 1906.

Application filed November 24, 1905. Serial No. 288,928.

*To all whom it may concern:*

Be it known that I, ALBERT T. SISSON, of Providence, in the county of Providence and State of Rhode Island, have invented certain new and useful Improvements in Ball-Bearings, of which the following is a specification.

This invention relates to ball-bearings for shafts, &c.

The objects of the invention are to provide a bearing of a standard size which can be made to fit a variety of shafts within suitable limits, of which each of the wearing parts may be removed and renewed without requiring change of any of the other parts and to secure economy of manufacture and use.

In the accompanying drawings, representing the preferred embodiment of the present invention, Figure 1 represents an axial sectional view of the bearing. Fig. 2 represents an end elevation thereof, parts being broken away to show the interior in section.

The same reference characters indicate the same parts in both figures.

The bearing comprises, essentially, a sleeve 1, adapted to be fitted upon a shaft; a pair of rings 2 3, mounted externally upon the sleeve and formed with a ball-groove between them; a series of balls 4; an external annulus or collar 5, having a ball-receiving groove, and adjusting and locking nuts 6 7 for positioning the rings. The sleeve 1 is made cylindrical upon its outer face, and the rings 2 3 are ground with a truly cylindrical bore, so as to fit accurately upon the sleeve. Each of the rings has a groove or keyway 8, into which project keys in the form of pins 9, mounted upon the sleeve. These pins permit the rings to slide axially upon the sleeve, but prevent any relative rotary movement. A flange 10 on the end of sleeve 1 provides a shoulder against which the ring 2 abuts and by which the ring is prevented from slipping off the end of the sleeve. On the other end of the sleeve the nuts 6 and 7 are mounted and bear against the other ring 3 for holding and positioning the latter upon the sleeve and adjusting its distance from the ring 2. It will be seen that the rings 2 and 3 have each a beveled or inclined side 11 12, respectively, and that these sides are adjacent each other, forming the groove in which the antifriction-balls are held and are caused to run, while the exterior annulus has an internal groove 13 complementary to and surrounding the first-named groove, into which also the balls 4 project. The annulus 5 retains the balls in engagement with the bearing-rings and forms the part of the bearing which is complemental to that consisting of the rings 2 3 and sleeve 1. By adjustment of the bearing-ring 3 through manipulation of the adjusting-nuts the degree of pressure or of looseness of the balls in the grooves may be varied, there being a sufficient space left between the rings 2 and 3 to permit the amount of adjustment necessary to bring the balls into firm engagement with the sides of both the grooves.

The sleeve 1 is made of ordinary soft machinery-steel, while the rings 2 3, as also the collar 5, are made of crucible or tool steel and suitably hardened to resist wear. The two bearing-rings are preferably identical in form, being thereby interchangeable, and they are readily removable from the sleeve, so that in case one or the other of them becomes worn the worn-out member may be removed and another similar one substituted without requiring change of any of the other parts, and particularly without requiring in any event the substitution of a new sleeve 1.

By constructing the sleeve 1 of soft steel the sleeves may be made of standard sizes and of internal diameters to fit the smallest shafts for which they are respectively designed and may be subsequently reamed or bored out to fit larger shafts within reasonable limits. Thus it is not necessary to make an entirely new sleeve or turn down the shaft in case one of the standard bearings does not exactly fit a shaft to which it is to be applied, as is necessary in cases where hardened-steel sleeves having ball-bearing surfaces are used, and thus the bearings may be made in quantities all of the same size, and consequently at less cost than where special sizes are required, and sold at a smaller figure. By reason, also, of having each of the bearing-rings detachable from the sleeve it is not necessary when one of them wears out to discard the whole sleeve and substitute a new one, as is the case when one of the bearing-surfaces is formed directly upon the sleeve. Thus there is economy in maintenance of the bearing.

In order to prevent the adjusting of lock-nuts 7 from jarring loose, I provide a locking member consisting of a ductile metal disk or washer 14, interposed between the two nuts and having its periphery notched at intervals to provide between the notches tongues 15. The nuts are also provided with peripheral notches 16 17, respectively, into which the tongues 15 may be bent, while the disk has a tongue 19 in its bore, projecting into a slot or keyway 20 of the sleeve to hold the disk from rotating. As long as the tongues occupy these notches it is evident that rotation of the nuts is prevented. As the disk 14 is thin and made of very ductile material, it is easy to remove the tongues from the notches which they occupy whenever adjustment of the bearing is necessary. The nuts are identical in size and formation for each standard size of bearing, so that they are interchangeable with each other and with all nuts of the same size in stock, for which reason it is easy to make substitution for lost or broken nuts.

The rings 2 3 are provided with peripheral grooves 18, into which the end of a prying-tool may be inserted for loosening and removing a ring from the sleeve. A suitable form and the manner of use of such a tool are indicated in dotted lines in Fig. 1.

After the parts above described are assembled the bearing becomes a unit, which can be quickly and conveniently applied as a whole and can be made to fit accurately upon a shaft by simply reaming or boring out the interior of the sleeve 1 to the required extent, without necessitating disturbance of the parts or alteration of the adjustment of the bearing. There are also so few parts for which substitution is ever necessary on account of wear, breakage, loss, &c., and these parts are all so simple in construction and so easily made that their cost is comparatively trifling. Accordingly it is possible to maintain the bearing in perfect running condition with the minimum of expense. It will be noted that the flange or head 10 of the sleeve 1 has notches 21 in its periphery. These are provided to receive the toe of a spanner-wrench which may be inserted in one of such notches to retain the sleeve against rotation when the nuts 6 7 are turned to adjust the bearing-rings or to dismember or reassemble the bearing when it is in position on a shaft.

I claim—

1. As an article of separate manufacture and sale, a ball-bearing comprising in combination, a soft-metal sleeve having a shoulder on one end, threaded adjacent its other end and having a smooth intermediate portion, hardened-steel rings fitting upon the smooth portion of the sleeve and beveled on their adjacent sides to form between them a ball-groove, one of said rings abutting against said shoulder, an annulus of hardened steel having an internal groove surrounding the beveled portions of the rings, a series of balls between the annulus and rings, an adjusting-nut screwed on the threaded end of the sleeve for preventing separation of the rings, and coacting means on the sleeve and rings for preventing rotation, while permitting axial sliding, of the latter on the former.

2. A ball-bearing comprising a sleeve having an annular shoulder, a ring mounted on the sleeve abutting against said shoulder, a second ring mounted on the sleeve beside the first ring, said rings being formed with adjacent inclined sides making a ball-groove between them, an annulus having an internal groove surrounding the groove between the rings, a series of antifriction-balls retained in said grooves between the rings and annulus, an adjusting-nut threaded on the sleeve abutting against the second ring, a lock-nut, and a disk between said nuts having flexible tongues adapted to be bent over into engagement with depressions in the peripheries of the nuts.

3. A ball-bearing comprising a sleeve, a pair of rings each beveled on the side adjacent the other to form between them a ball-groove, each ring having a longitudinal groove in its bore, projections on the sleeve extending into the grooves of the rings whereby the latter are enabled to slide axially on the sleeve but are restrained from rotating thereon, an annulus having an internal ball-groove surrounding the beveled sides of the rings, a series of balls contained between the rings and annulus, and means on the sleeve preventing separation of the rings.

In testimony whereof I have affixed my signature in presence of two witnesses.

ALBERT T. SISSON.

Witnesses:
JOSEPH SHARPLES,
JESSE O. CORNAN.